(12) United States Patent
Marleau et al.

(10) Patent No.: US 8,866,100 B1
(45) Date of Patent: Oct. 21, 2014

(54) TIME ENCODED RADIATION IMAGING (71) Applicant: Sandia Corporation, Albuquerque, NM (US)

(72) Inventors: Peter Marleau, Dublin, CA (US); Erik Brubaker, Oakland, CA (US); Scott Kiff, Pleasanton, CA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/010,352

(22) Filed: Aug. 26, 2013

Related U.S. Application Data (60) Provisional application No. 61/694,564, filed on Aug. 29, 2012.

(51) Int. Cl.
G01T 3/06 (2006.01)
G01T 1/29 (2006.01)

(52) U.S. Cl.
CPC ............... G01T 3/06 (2013.01); G01T 1/2907 (2013.01)
USPC .................................................. 250/390.11

(58) Field of Classification Search
CPC .......... G01T 3/06; G01T 1/167; A61B 6/027; A61B 6/4258; G01V 5/0025; G01G 9/005; G01F 23/288
USPC ....................................... 250/390.01–390.12
See application file for complete search history.

(56) References Cited

U.S. PATENT DOCUMENTS 3,899,676 A * 8/1975 Goldstein et al. ............. 376/171
4,483,816 A * 11/1984 Caldwell et al. ............. 376/158
5,184,019 A * 2/1993 MacArthur et al. .......... 250/380

OTHER PUBLICATIONS

Boyce, et al., "Thermal Neutron Imaging with a Rotationally Modulated Collimator (RMC)", 2009 IEEE Nuclear Science Symposium Conference Record, 2009, pp. 1129-1133.
Hurford, et al., "The Rhessi Imaging Concept", Solar Physics, 2002, vol. 210, iss. 1, p. 61-86.
Koral, et al., "Digital Tomographic Imaging with Time-Modulated Pseudorandom Coded Aperture and Anger Camera", Journal of Nuclear Medicine, 1975, vol. 16, No. 5, pp. 402-413.
Kowash, et al., "A Rotating Modulation Imager for Locating Mid-Range Point Sources", Nuclear Instruments and Methods in Physics Research Section A, 2009, vol. 602, Issue 2, pp. 477-483.
Lacy, et al., "Long Range Neutron-Gamma Point Source Detection and Imaging Using Unique Rotating Detector", 2007 IEEE Nuclear Science Symposium Conference Record, vol. 1, pp. 185-191.
May, et al., "Gamma-Ray Imaging with Stochastic Apertures", Applied Optics, Nov. 1974, vol. 13, No. 11, pp. 2589-2601.

* cited by examiner

*Primary Examiner* — Kiho Kim
(74) *Attorney, Agent, or Firm* — Medley Behrens & Lewis LLC (57) ABSTRACT

The various technologies presented herein relate to detecting nuclear material at a large stand-off distance. An imaging system is presented which can detect nuclear material by utilizing time encoded imaging relating to maximum and minimum radiation particle counts rates. The imaging system is integrated with a data acquisition system that can utilize variations in photon pulse shape to discriminate between neutron and gamma-ray interactions. Modulation in the detected neutron count rates as a function of the angular orientation of the detector due to attenuation of neighboring detectors is utilized to reconstruct the neutron source distribution over 360 degrees around the imaging system. Neutrons (e.g., fast neutrons) and/or gamma-rays are incident upon scintillation material in the imager, the photons generated by the scintillation material are converted to electrical energy from which the respective neutrons/gamma rays can be determined and, accordingly, a direction to, and the location of, a radiation source identified.

20 Claims, 7 Drawing Sheets

TIME ENCODED RADIATION IMAGING

RELATED APPLICATION

This application claims priority to U.S. Provisional Patent Application No. 61/694,564, filed on Aug. 29, 2012, entitled "TIME ENCODED RADIATION IMAGING", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

The detection of special nuclear material (SNM) at a large stand-off distance has application in such fields as nuclear security and counter-terrorism. At a given standoff distance a detector can utilize detection of either neutrons or gamma-rays as a signature of the nuclear material due to the respectively high penetrating power of the neutrons or gamma-rays. Compared with gamma-rays, neutrons (e.g., fast neutrons) have a background that is relatively low and understood, which can provide an ideal regime for detection of nuclear material in large search area scenarios.

Currently there are two main approaches for generation of a neutron imager. In a first approach, a coded aperture can be based on a front pixelated mask plane containing hydrogenous material in combination with a detector array as the rear plane. The pattern of the mask plane can be based on a uniformly redundant array (URA) which has a mathematical property to facilitate unique reconstruction of the spatial distribution of a source under ideal imaging conditions. Additionally, an optimized random mask can also be utilized. However, in practice, the construction and calibration of a large detector array can impact the cost and performance of such detectors.

In a second approach, the front mask plane can be replaced with another large detector plane and accordingly identifies coincidence scattering in the front and rear plane. A device utilizing such technology is known as a scatter camera. In this approach, the direction of an incoming neutron can be constrained and hence maps out a source distribution. Such an approach has been shown to be successful in near and medium distance regimes, however the requirement of double scatters can greatly reduce system efficiency and further can increase a dwell time necessary for long-range detection.

Time-encoded imaging (TEI) is a recently developed method for SNM detection with neutrons that overcomes the limiting factors of the two main approaches. The concept relies on measuring the presence of a nuclear source as a time varying neutron rate as it is modulated by shielding material moving around each detector. TEI designs feature simple construction reducing cost and complexity while maintaining a high efficiency by requiring only single scatters. Additionally by converting spatial variations into temporal rates the system is more robust against non-uniformities in the detected background due to detector geometry. For these reasons TEI detectors offer simple, low-cost, and highly efficient solutions for detecting SNM. Another approach utilizes Rotating Modulated Collimators (RMC). However, while incorporating some of the advantages of a TEI design, the RMC approach is unsuitable for neutron detection owing to the required thick masks significantly reduce the efficiency of the imager.

SUMMARY

The following is a brief summary of subject matter that is described in greater detail herein. This summary is not intended to be limiting as to the scope of the claims.

Various exemplary embodiments presented herein relate to determining a location of a radioactive source material. In an exemplary embodiment a system is presented, wherein the system comprises a first detector located on a turntable, wherein the first detector includes a first volume of scintillation material, and a second detector located on the turntable, wherein the second detector includes a second volume of scintillation material. The first detector and the second detector rotate about the turntable to facilitate a first position where the first detector is located proximate to a radiation source and a second position where the second detector is located between a position of the first detector and the radiation source. The system further comprises a locator component configured to determine a first amount of radiation incident upon the first detector when located in the first position and further determine a second amount of radiation incident upon the first detector when located in the second position, wherein the a count of the first amount of radiation exceeds a count of the second amount of radiation.

Another exemplary embodiment comprising a method for locating a first detector on a turntable, locating a second detector on the turntable, wherein during rotating of the turntable the position of the first detector and the second detector changes relative to a remotely located radiation source, and determining a first number of neutrons impinging upon the first detector while the first detector is positioned proximate to the radiation source. The method further comprising determining a second number of neutrons impinging upon the first detector while the second detector is located between the first detector and the radiation source, and determining the location of the radiation source based upon a difference between the first number of neutrons and the second number of neutrons.

A further exemplary embodiment for determining the location of a radiation source comprises a computer-readable medium comprising instructions that, when executed by a processor, cause the processor to perform acts determining a first number of neutrons impinging upon a first detector while the first detector is positioned proximate to a radiation source, the first detector is located on a turntable, determining a second number of neutrons impinging upon the first detector while a second detector is located between the first detector and the radiation source, wherein the second detector is located on the turntable and during rotating of the turntable the position of the first detector and the second detector changes relative to a remotely located radiation source, and determining the location of the radiation source based upon a difference between the first number of neutrons and the second number of neutrons, wherein the first number of neutrons is a maxima and the second number of neutrons is a minima as the first detector and the turntable rotate through 0° to 360° about a central axis of the turntable.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to detecting a location of a nuclear material are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further; the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As noted above, exemplary embodiments presented herein relate to detecting the presence of radiation. While gamma-ray based radiation can be prevalent as a background radiation, advantage can be taken of the lower incidence of neutron-based radiation. By detecting the presence of neutron-based radiation in a gamma-ray background it is possible to extrapolate a direction from a detector to a source of the neutron-based radiation. As described further herein, by utilizing at least two detectors rotating about a common point (e.g., both are located on a turntable), a second detector can be utilized to occlude a first detector from the radiation source, e.g., by absorbing a portion of the neutron radiation at the second detector thereby reducing the number of neutrons incident on the first detector. Accordingly, while the first detector is local to radioactive material it is anticipated that a number of detected neutrons will be high (e.g., a maxima), and alternatively, when the radioactive material is being occluded by the second detector the number of neutrons detected at the first detector will be low (e.g., a minima). With knowledge of the respective positions of the first detector and the second detector at the time when the maximum occlusion occurs, a direction to, and a position of, the radiation source with respect to the positions of the first detector and second detector can be determined. Fast neutrons are of interest as they have likely not been scattered, e.g., by atoms, particles, etc., comprising air between the radiation source and a detector(s), and thus retain their directional history with regard to the radiation source from which they were emitted.

Figure 1:
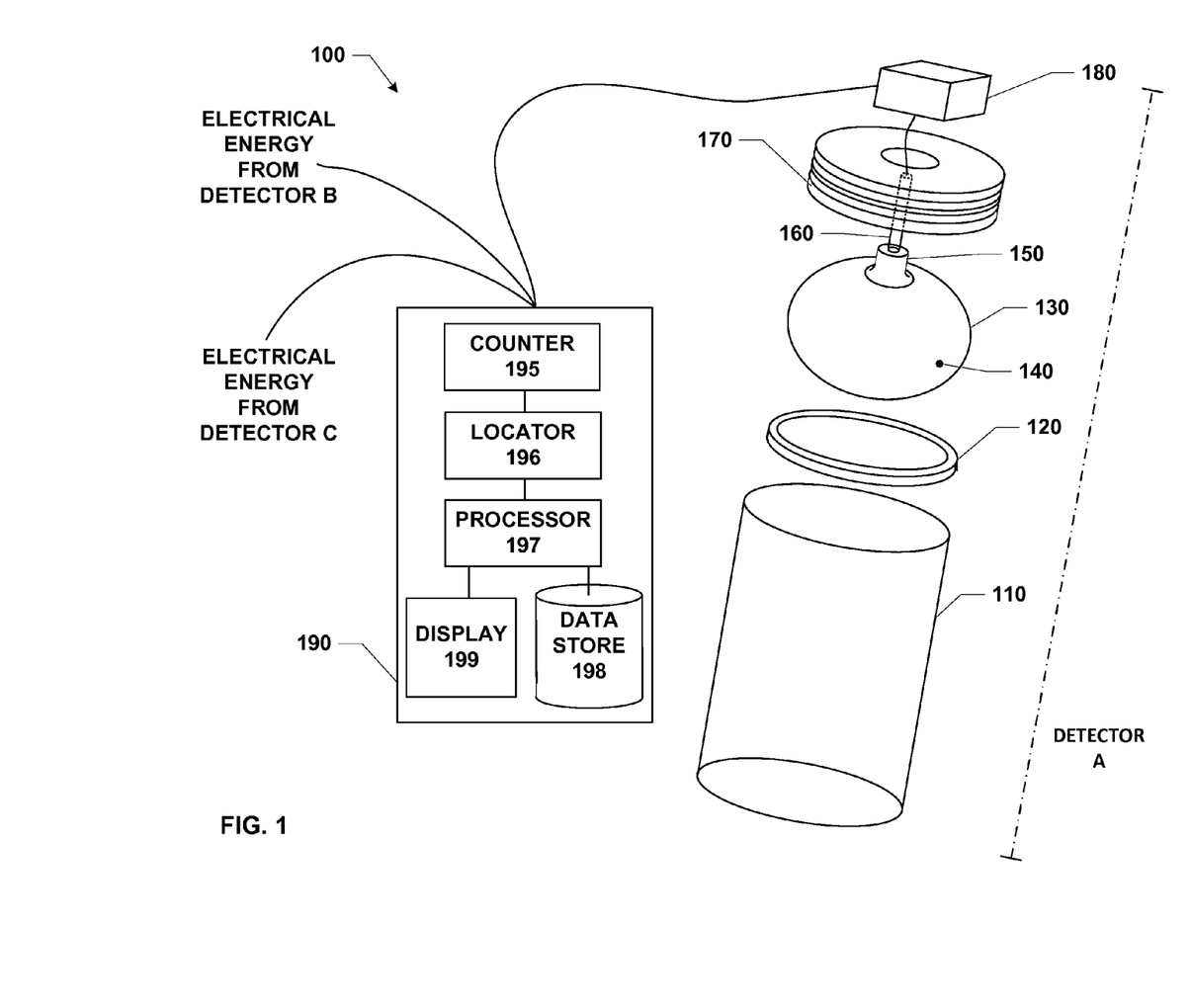
FIG. 1 illustrates a system for determining a location of a radiation source, according to an embodiment.

FIG. 1 illustrates an exploded view of various components which can comprise an imaging system 100 to facilitate the detection of the presence of radiation. A photomultiplier vessel (PMV) 130 can contain a volume of sensor material 140, whereby when a first energetic radiation particle, e.g., a gamma-ray, a neutron, etc., is incident upon the sensor material 140, an interaction can occur such that a secondary energetic particle is generated and the magnitude of the secondary energetic particle can be determined. In an embodiment, the sensor material 140 can be a scintillator, whereby upon a particle having the first energy (e.g., a gamma-ray, a neutron, an electron, an alpha particle, an ion, a high-energy photon, etc.) impacts an element in the sensor material 140, the first energy is absorbed by the sensor material 140, causing the sensor material 140 to scintillate and emit a second energy in the form of a photon (or other electromagnetic radiation). A photomultiplier tube (PMT) 160 can be located in the PMV 130 (e.g., via opening 150), with the PMT 160 absorbing the photon emitted by the sensor material 140, and further re-emitting the second energy of the photon in the form of an electron(s), as a function of a photoelectric effect. The electrical energy generated by the PMT 160 can be analyzed at a data acquisition system 190. A counter component 195 can be utilized to provide a magnitude of electrical energy received from PMT 160 for a given angle of rotation of one or more detectors (as further described below). The magnitude of electrical energy determined by counter 195 can be forwarded to a locator component 196, wherein the locator component 196 can be configured to identify differences in the magnitude of electrical energy received for a plurality of locations of the PMT 160 relative to other PMTs in the system (e.g., in detectors B and C) and a radiation source. Data acquisition system 190 can further include a processor 197 utilized to facilitate determination of a location of a radiation source in conjunction with the locator component 196, and further a data store 198 which can be utilized to store data relating to the magnitude of electrical energy received from PMT 160, angular location of PMT 160, etc. For example, a determination of the location of the radiation source can be performed based upon occlusion of radiation incident upon detector A by at least one other detector (e.g., detector B and/or detector C). During, or subsequent to, determination of the location of the radiation source, pertinent information can be presented on display 199, such as a plot of angular location of a PMT 160/PMV 130 and a rate of radiation particle interaction generated for that angular location, a determined direction and/or location of a radiation source, a plot of a plurality of PMTs (including the PMT 160) for a plurality of systems having a configuration similar to imaging system 100. As shown, a plurality of radiation detectors can be utilized, with electrical energy being received at data acquisition system 190 from a second detector, system B, a third detector, system C, . . . an nth detector, system n, (where n is a positive integer), as further described herein.

Sensor material 140 can be of any suitable composition and phase such as an organic crystal comprising an aromatic hydrocarbon compounds (e.g., which can include a benzene ring structure). Organic scintillators include anthracene stilbene ($C_{14}H_{12}$) and naphthalene ($C_{10}H_8$). Organic liquids can also be utilized, including p-terphenyl ($C_{18}H_{14}$), PBD ($C_{20}H_{14}N_2O$), butyl PBD ($C_{24}H_{22}N_2O$), PPO($C_{15}H_{11}NO$), and a wavelength shifting material such as POPOP ($C_{24}H_{16}N_2O$). Solvents can include toluene, xylene, benzene, phenylcyclohexane, triethylbenzene, and decalin. Further, liquid scintillators can be combined with other additives such as wavelength shifters to match the spectral sensitivity range of a particular PMT, or to increase the neutron detection efficiency of the scintillation counter itself. For many liquids, dissolved oxygen can act as a quenching agent and can lead to reduced light output, hence there may be a necessity to seal the scintillating solution in an oxygen-free, air-tight enclosure (e.g., PMV 130). The scintillating material can also comprise of a plastic scintillator, where the scintillating material in which the primary fluorescent emitter (e.g., a fluor) is suspended in the base, a solid polymer matrix. Polyethylene naphthalate can be a suitable material, as it exhibits scintillation without any additives. Base materials can include aromatic polymers such as polyvinyltoluene (PVT), polystyrene (PS), polymethylmethacrylate (PMMA), polyvinyl xylene (PVX) polymethyl, 2,4-dimethyl, 2,4,5-trimethyl styrenes, polyvinyl diphenyl, polyvinyl naphthalene, polyvinyl tetrahydronaphthalene, and copolymers of these and other bases. Fluors can include polyphenyl hydrocarbons, oxazole and oxadiazole aryls, especially, n-terphenyl (PPP), 2,5-diphenyloxazole (PPO), 1,4-di-(5-phenyl-2-oxazolyl)-benzene (POPOP), 2-phenyl-5-(4-biphenylyl)-1,3,4-oxadiazole (PBD), and 2-(4'-tert-butylphenyl)-5-(4''-biphenylyl)-1,3,4-oxadiazole (B-PBD). Scintillators can also include inorganic materials such as an alkali metal halide, NaI(Tl) (sodium iodide doped with thallium), CsI(Tl), CsI(Na), CsI(pure), CsF, KI(Tl), LiI(Eu). Some non-alkali crystals include: $BaF_2$, $CaF_2(Eu)$, ZnS(Ag), $CaWO_4$, $CdWO_4$, YAG(Ce) ($Y_3Al_5O_{12}$(Ce)), GSO, LSO, lanthanum chloride ($LaCl_3(Ce)$), lanthanum bromide, ($LaBr_3(Ce)$). LYSO ($Lu_{1.8}Y_{0.2}SiO_5(Ce)$) BGO. Gaseous scintillators can include nitrogen and the noble gases helium, argon, krypton, and xenon. Glass scintillators can include cerium-activated lithium or boron silicates.

To facilitate construction and protection of the PMV 130 and the PMT 160, the PMV 130 and PMT 160 can be located in a protective vessel, such as a container 110, with the PMV 130 located in place via a supporting ring 120 and a lid 170, where either of the supporting ring 120 and the lid 170 can further include an o-ring seal or similar system to locate and seal the PMV 130. A connector 180 can be utilized to facilitate connection of PMT 160 to data acquisition system 190. In an embodiment, components 110, 120, 130, 140, 150, 160, 170, and 180 can be combined to form a 'detector', e.g., detector A. Container 110, ring 120, vessel 130, lid 170 and connector 180 can be formed from any suitable material which is transparent to the passage of gamma-rays and neutrons, such as steel, aluminum, etc.

Figure 2:
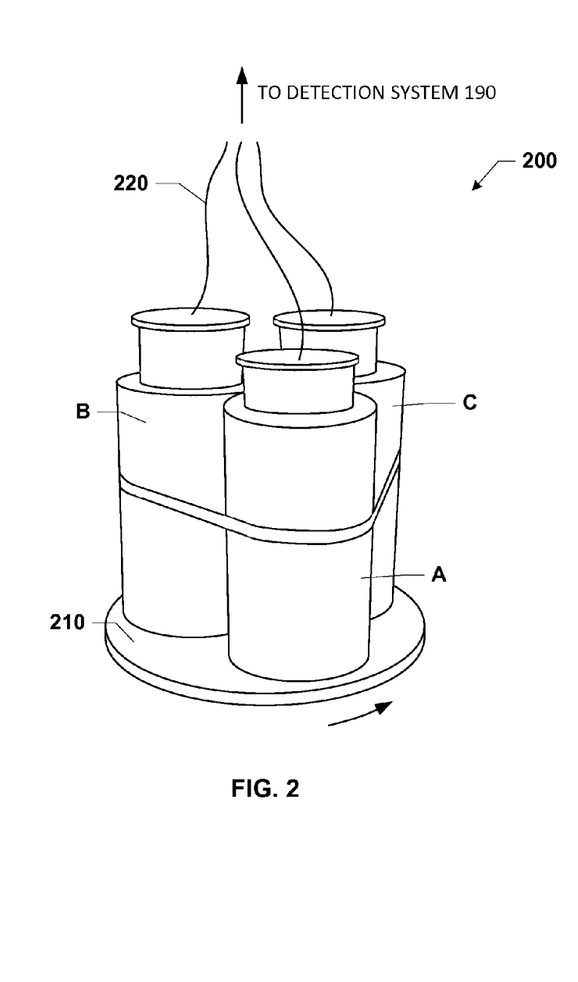
FIG. 2 illustrates a system for determining a location of a radiation source, according to an embodiment.
Figure 3:
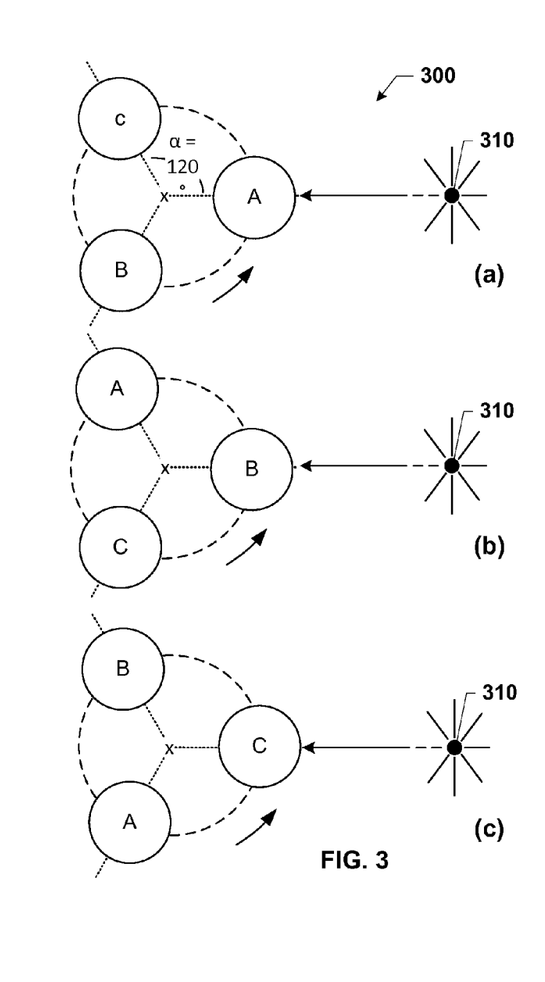
FIGS. 3A-3C illustrate a series of block diagrams representing motion of a plurality of detectors relative to a radiation source, according to an embodiment.

A plurality of detectors can be utilized in a radiation detection system. FIG. 2 illustrates a block diagram representation of a system 200 comprising of three detectors, A, B and C, located on a turntable 210 to facilitate rotation of the detectors A, B, and C about a central point X respectively at an angle α of 120°, as shown in FIGS. 3a-c. With knowledge of the angular spacing between each detector, as the detectors rotate through 360° about point X, a determination of the location of a radiation source 310 can be made. Completing a full rotation of detectors A, B, and C about point X can be performed over any required time period. For example, the frequency of rotation can be 1 minute, where, at such a frequency timing effects such as photon generation by a scintillating material, scintillator relaxation, conversion of the photon to an electrical signal, analyzing the electrical signal for both number of pulses and pulse origination (e.g., neutron-induced or gamma-induced, as described further below), and determination of a direction to a source, can be performed on a relatively short timescale compared with the frequency of rotation of detectors A, B, and C about point X.

Figure 4:
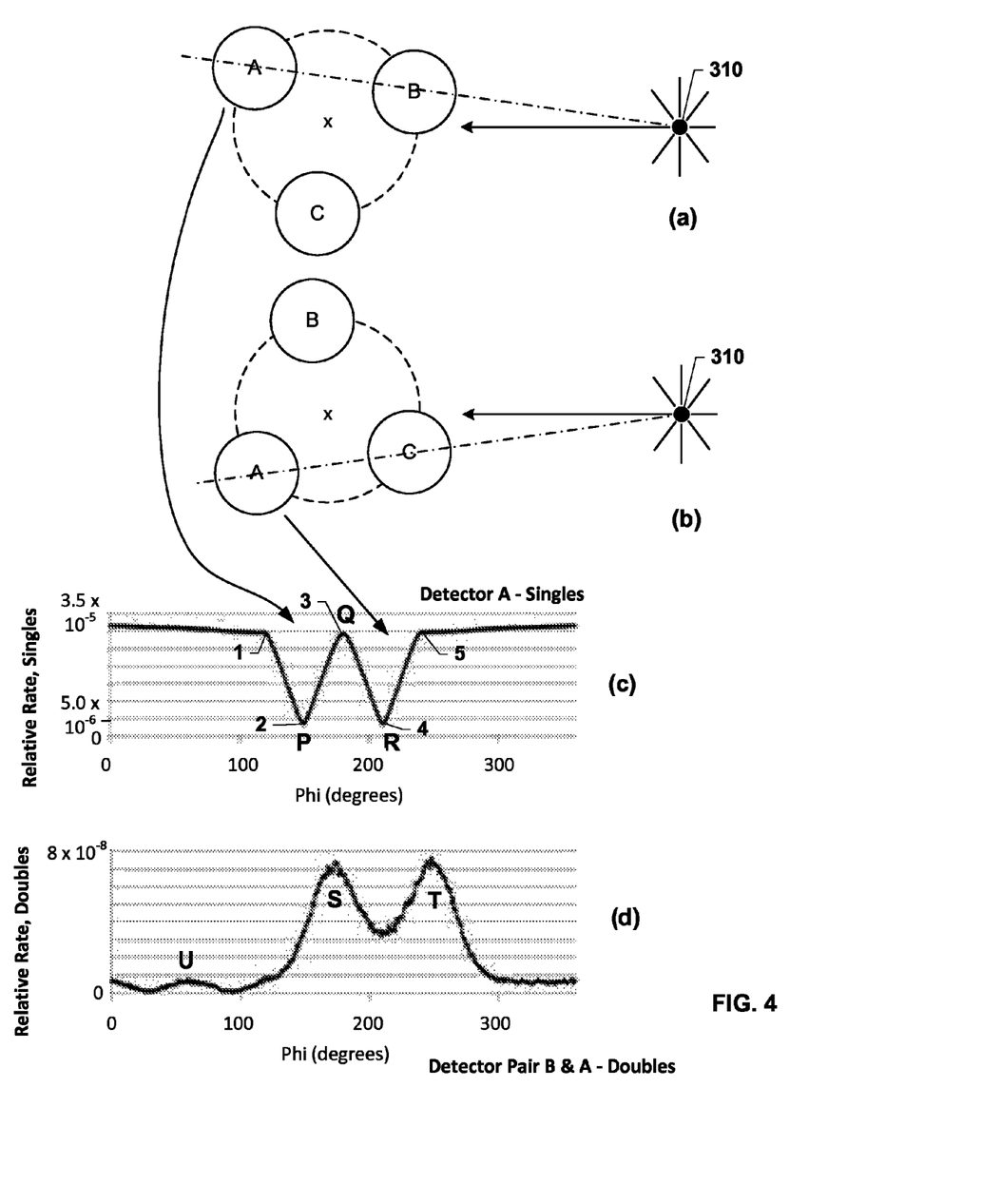
FIGS. 4A and 4B illustrate a series of block diagrams representing motion of a plurality of detectors relative to a radiation source, according to an embodiment.
FIGS. 4C and 4D depict plots of radiation signals measured for a detector and a pair of detectors, according to an embodiment.

FIG. 4 illustrates a block diagram of system 400 depicting how a second detector can be utilized to act as a mask for a first detector in a three detector system. As shown in FIG. 4a, during rotation of detector A about central point X, a first position can be reached whereby detector A is masked/occluded by detector B in relation to radiation source 310. Further, as shown in FIG. 4b, during rotation of detector A about central point X, a second position can be reached whereby detector A is masked by detector C in relation to radiation source 310. Accordingly, the masking effect of detectors B and C can be utilized to determine the position of the radiation source 310 relative to detector A (and in a similar manner, the masking of detector C by detectors A and B, and the masking of detector B by detectors A and C). FIG. 4c is a plot of measured radiation for a given position of detector A (and similarly detectors B and C with respective positional shifting of Φ based upon the angular position of detectors B and C on the turntable) with respect to a particular angle Φ about point X. As shown in FIG. 4c, the measured radiation is fairly flat at a relative rate of $3.00 \times 10^{-5}$ for Φ angles 0-120°, 180°, and 240-360°. However, at position P, about 150°, the measured radiation drops to a relative rate of about $5.00 \times 10^{-6}$ as a result of masking of detector A by detector B (per, FIG. 4a), e.g., the neutron count rate at detector A is at a minimum. The measured radiation returns to about $3.00 \times 10^{-5}$ at position Q owing to detector A being in line of sight of radiation source 310, e.g., the neutron count rate at detector A is at a maximum. At position R, about 220°, the measured radiation again drops to about $5.00 \times 10^{-6}$ as a result of masking of detector A by detector C (per, FIG. 4b), e.g., the neutron count rate at detector A is again at a minimum. Hence, by determining the position at which masking occurs, positions P and R, it is possible to determine a direction to, and a position of, a radiation source 310 at the midpoint Q between masking positions P and R. Thus, by utilizing the various detectors in different positions of rotation and identifying where the drops in signal strength occur (e.g., position P and R), the detectors A, B, and C are functioning as a self-shielded modulating system. It is to be appreciated that while FIG. 4c illustrates the neutron count rate at position Q of detector A to be of an order similar to the count rates for Φ angles 0-120° and 240-360°, a situation can occur where the count rate at position Q is much greater than the count rates for Φ angles 0-120° and 240-360° owing to detector A being close to the radiation source. Hence, identification of the location of the radiation source can be an extrapolation from the respective maximum and minimum neutron count rate positions for detector A.

In a further embodiment, a change in a number of neutrons being detected at a detector (e.g., detector A) can further act as an indicator of a direction and/or location of a radiation source. For example, the change in count rate between the count at position Q and the count rates at positions P and R (e.g., any of positions 1-5 indicated on FIG. 4c). In a further embodiment, a rate of change of the count rate, e.g., a transition between a high rate and a low rate (e.g., any of positions 1-5 indicated on FIG. 4c), can further provide determination of the direction to and/or location of the radiation source. Hence, while count rate maxima and minima can be used to determine a direction to and/or location of a radiation source, the transitions between maxima and minima (e.g., any of positions 1-5 indicated on FIG. 4c) can further refine the determination of the radiation location. In effect, a plurality of transitions, counts, count rate ramps, etc., can be utilized across the entire signal modulation pattern as shown in FIG. 4c.

In a further embodiment, by utilizing a time-encoded technique, it is possible to 'decouple' a count rate pertaining to a neutron radiation background and a count rate resulting from the radiation source. For example, the respective magnitudes of the maxima (e.g., Q) and the minima (e.g., P or R) in a signal modulation pattern (e.g., FIG. 4) can enable an estimation of the neutron radiation background to be identified, whereby the minima can be considered an indication of the background radiation. While detector A is local to a radiation source, an according maxima in count rate can occur. However, when the detector A is being occluded from the radiation source (e.g., by detector B), a neutron count (e.g., the count at the minima) can be considered to be the neutron radiation background. Hence, by identifying a magnitude of the neutron radiation background (e.g., from the minima), it is possible to determine the location of a radiation source even in the event of the radiation source having a weak neutron signature.

In another scenario, a neutron radiation background may not be uniform with respect to angular orientation. Accordingly, in an embodiment, the rotation of detector about Φ can be broken down into 'bins' of defined angles, e.g., 0-30, 30-60, 60-90 ... 330-360, etc., with an estimate of the neutron radiation background being identified for each bin. Once an estimate has been defined for each bin, a determination can be made regarding whether a radiation source is located in a particular bin based upon a deviation (e.g., an increase in neutron count rate) from the estimated neutron radiation background. Hence, it is possible to locate a source based upon the maxima and/or minima in neutron count, as previously described, and also to detect a source based upon an estimation of a neutron radiation background concurrent with a neutron count rate being received from a radiation source.

Further, as shown in FIG. 4d, double interactions can also be of interest, where such double interactions can occur as a result of a radiation particle being scattered by a detector rather than being absorbed by the detector material (e.g., sensor material 140). The double interaction observation map shown in FIG. 4d illustrates how the frequency of double interactions from detector B (or detector C) into detector A can vary as a function of Φ. In a situation where detector B is on the far side of a system and detector A is closer to a source 310, the double interaction signal is fairly constant and low, region U of the plot. During such a situation, it is difficult for a particle emanated from source 310 to reach detector B and then scatter back into detector A. The higher rate regions S and T on the plot shown in FIG. 4d can occur while detector B is closer to the source 310, i.e., detector B is located approximately between, or nearly between, the detector A and the source 310. In an embodiment, the maxima of S and T can occur when a vector from the source 310 to detector B makes a 30° angle with a vector from detector B to detector A, which is in accordance with fast neutron kinematics. In an example determination, utilizing detectors with a 5" diameter PMV 130, it was found that there were about 400 times more single scatters than double scatters in a measured plurality of signals. Hence, while double interactions may be a small percentage of a total signal, adding the double interaction response/response to an image reconstruction can help improve the angular resolution of a detector system (e.g., imaging system 100) in determining the location of a radiation source 310.

In an embodiment, it is possible to distinguish between whether a gamma-ray is incident upon a scintillator material or a neutron is incident. For example, a scintillator (e.g., a liquid phase scintillator) having a neutron/gamma pulse shape discrimination (PSD) can be utilized. Briefly, PSD is a technique utilized for the detection of high-energy neutrons in the presence of a gamma radiation background. The technique can be based on the difference in the shape of a scintillation signal generated due to excitation by neutrons and the shape of a scintillation signal generated due to excitation by gamma-rays in a scintillator (e.g., an organic scintillator). According to a commonly accepted mechanism, both gamma-induced and neutron-induced pulses contain a short decay (prompt) component and a long decay (delayed) fluorescence component. The prompt component can result from a direct radiative de-excitation of excited singlet states ($S_1$), while the slow component can be determined by the kinetics of the triplet ($T_1$) exciton diffusion process preceding the triplet-triplet interaction and annihilation: $T_1+T_1 \rightarrow S_0+S_1$, which can lead to the excitation of additional singlet states decaying with the same spectral distribution, but over a longer and delayed time scale. The short range of energetic protons produced from neutron collisions yields a high concentration of triplets, which can lead to an enhanced level of delayed emission in neutron-induced pulses in comparison to those produced by the longer range of the electrons from gamma interactions. The different proportions of the prompt and delayed components in scintillation pulses produced by neutron and gamma interactions can provide the basis for the pulse separation utilized in PSD techniques. Hence, in a situation where a high volume of gamma radiation forms a background noise, it is possible, by analyzing a plurality of scintillation pulses (e.g., the pulse profile) to determine a number of neutron-based pulses within the plurality of scintillation pulses. In an aspect, air can act as an attenuator of neutron-based radiation, for example, a reduction in a volume of neutron-based radiation emanating from a radiation source can be occur over a distance of about 100 meters. Accordingly, a high volume of background noise can be comprised of gamma-based radiation. However, by utilizing PSD it is possible to identify neutron-based radiation in the gamma-based background radiation. Thus, in an embodiment, given the low amount of neutron-based radiation (e.g., a low neutron count rate) occurring after a distance of 100 meters, if neutron-based radiation is detected then a reasonable determination can be made by identifying the direction in which the majority of neutron-based radiation is emanating from.

Figure 5:
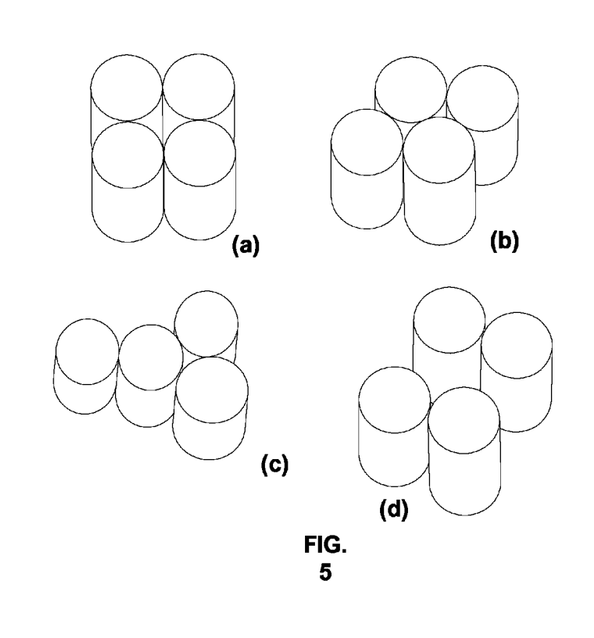
FIGS. 5A-5D illustrate a series of block diagrams representing various arrangements for a plurality of detectors, according to an embodiment.
Figure 6:
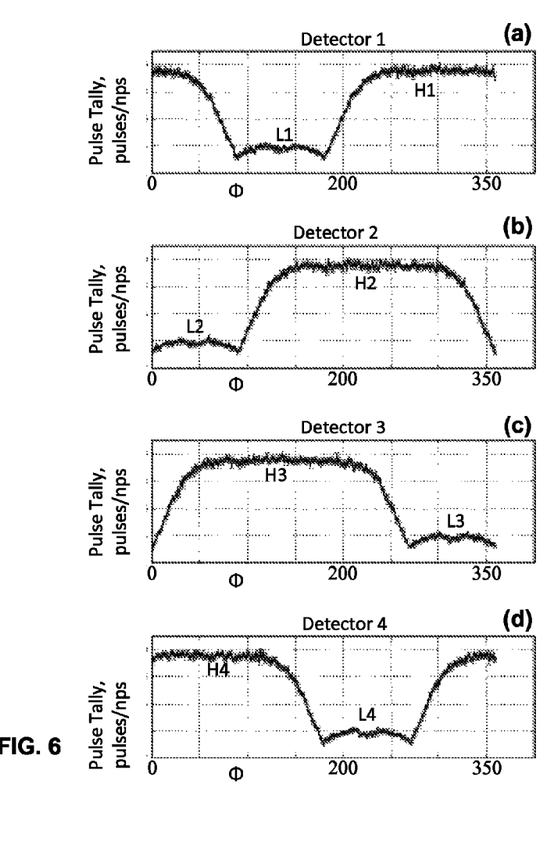
FIGS. 6A-6D depict plots of radiation signals measured for four different detectors, according to an embodiment.

It is to be appreciated that while an imaging system has been presented comprising an arrangement of three detectors (e.g., detectors A, B, and C) in a triangular formation, the various embodiments presented herein are not so limited and any number of detectors can be utilized in an imaging system. Owing to the various embodiments presented herein being based on the masking of a first detector by at least one other detector, an imaging system can utilize a minimum of two detectors rotating about a common point (e.g., common point X). Alternatively, as presented in FIGS. 5a-5d, an imaging system can be constructed with four detectors arranged in various configurations such as a square arrangement (FIG. 5a), a diamond arrangement (FIG. 5b), a clover arrangement (FIG. 5c), and a rectangular arrangement (FIG. 5d). Other arrangements can be configured utilizing any number of detectors, 2 to n, where n is a positive integer greater than 2.

FIGS. 6a-d present a series of plots of rotation angle Φ versus pulse tally for four detectors, detector 1, detector 2, detector 3, and detector 4, arranged in a square configuration. As illustrated, each plot for each respective detector has a low tally region, L1, L2, L3, and L4 respectively, and a high tally region, H1, H2, H3, and H4 respectively. Hence, as each detector rotates about a common point X, the radiation received at the detector (e.g., detector 1) is masked by the other detectors (e.g., detectors 2-4) relative to the position of a radiation source (e.g., radiation source 310).

Figure 7:
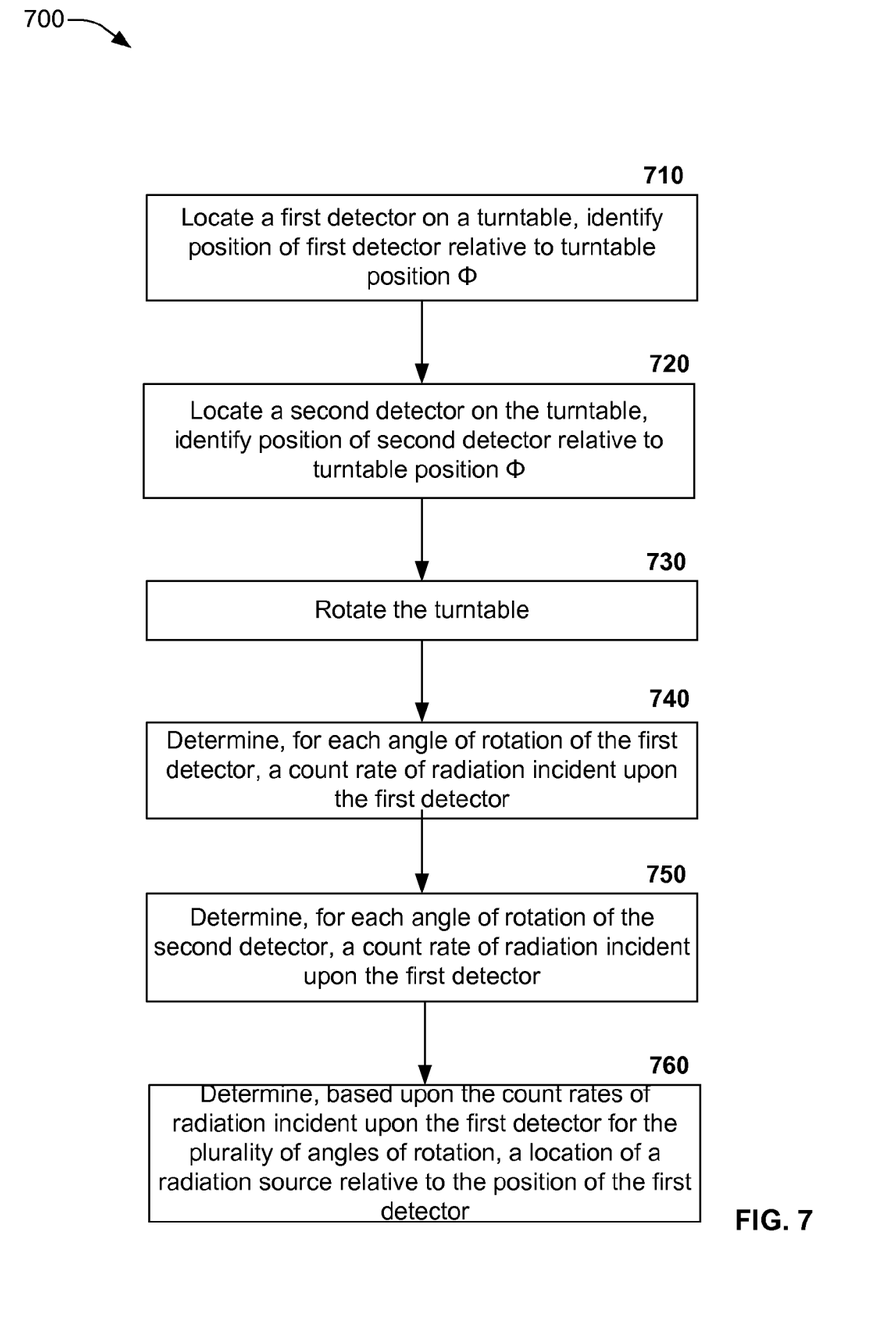
FIG. 7 is a flow diagram illustrating an exemplary methodology for determining a location of a radiation source.

FIG. 7 illustrates an exemplary methodology relating to determining a location of a radiation source. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

As previously mentioned, by utilizing at least two detectors rotating about a common point and measuring the radiation incident upon at least one of the detectors, a direction to, and/or a location of, a radiation source can be determined relative to the at least one detector. Owing to the at least two detectors rotating, the first detector can be masked from the radiation source by the second detector. The masking effect, e.g., a reduction in radiation incident upon the first detector, can be utilized to determine the location of the radiation source. At 710, an imaging system can be constructed whereby a first detector is mounted upon a rotating base such as a turntable. The position of the first detector can be identified in terms of an angular position relative to a full rotation of the turntable. The first detector can include a material (e.g., a scintillator) which, when impacted by energetic particles which can emanate from a radioactive source material (e.g., neutron-based radiation, gamma-ray based radiation, etc.), upon absorbing the energetic particles energy emits a photon or similar particle. The first detector can further include a PMT which can absorb the photon, and accordingly generate an electron(s), as a function of a photoelectric effect. Hence, the larger the energy of a particle incident upon the detector, the greater the number of photons generated, and accordingly the greater the number of electrons emitted in the PMT via the photoelectric effect.

At 720, a second detector can be mounted upon the rotating base, and the position of the second detector can be identified in terms of an angular position relative to a full rotation of the turntable. The second detector can also include a scintillating material, as well as a PMT, which operate as described with regard to the first detector.

At 730, the turntable can be rotated about a central point, or axis, X. Owing to the rotation of the turntable, the first detector and the second detector can respectively be brought into a position closer to a radiation source (the position of which is currently unknown) and to a position which is furthest away from the radiation source.

At 740, for each angular position of rotation of the turntable, an amount of radiation incident upon the first detector can be determined. In an embodiment, the scintillating material included in the first detector can facilitate neutron/gamma-ray PSD, where a photon generated by an incident neutron can be have a different profile to the photon generated by an incident gamma-ray, as previously discussed. Accordingly, it is possible to identify whether a photon is generated in response to an incident neutron or an incident gamma-ray.

At 750, for each angular position of rotation of the turntable, an amount of radiation incident upon the first detector can further be determined in relation to the position of the second detector. As previously mentioned, the second detector can be utilized as a mask between a radiation source and the first detector. For example, while gamma-rays comprise a large volume of a background radiation, neutron-based radiation can be attenuated by a volume of air such that after a certain distance from a radiation source the count of neutron-based radiation diminishes appreciably. Accordingly, a location of a radiation source can be identified based upon an amount of neutron-based energy being occluded by the second detector being positioned between the radiation source and the first detector. In a manner similar to the radiation being absorbed in the first detector, the same effect can be engendered when the second detector is closer to the radiation source than the first detector (e.g., the second detector is located on, or near to, the line-of-sight between the first detector and the radiation source) with the second detector absorbing the radiation particles.

At 760, the location of the radiation source can be determined. By analyzing the amount of radiation energy received at the first detector for the range of angular positions, the position of the second detector relative to the position of the first detector at which a drop in received radiation occurs, in conjunction with a determination of a radiation type (e.g., neutron-based, gamma-ray based), it is possible to identify at which angle in the rotation of the first detector about the central point X the reduction in received radiation energy occurs. In an embodiment, as previously mentioned, when the first detector is local to the radiation source the radiation count rate (e.g., a neutron count rate) will be at a maximum for the first detector, and when the first detector is occluded from the radiation source by the second detector, the radiation count rate will be at a minimum for the first detector at this position. The determined angle is the direction from central point X to the radiation source.

Figure 8:
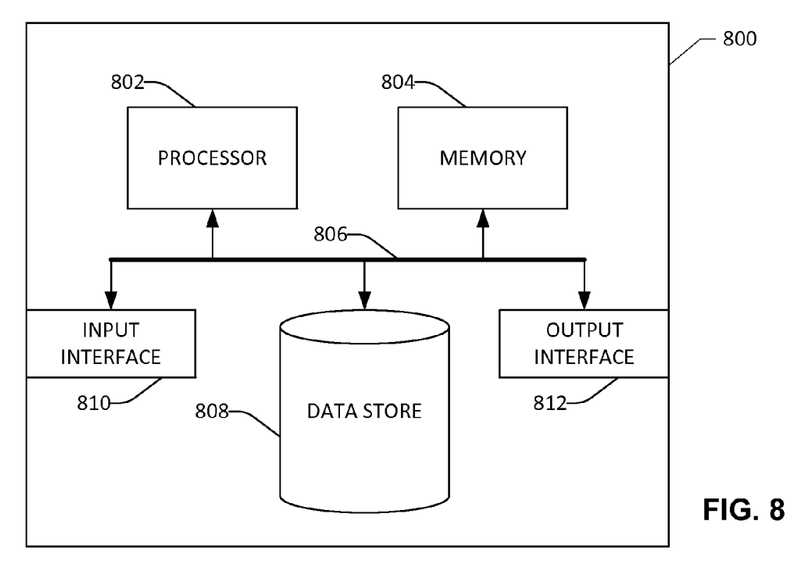
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used to determine a location of a radioactive material based upon the received neutron-based and gamma-ray based radiations received from a plurality of detectors. For example, computing device 800 can operate in conjunction with at least one of the counter component 195 and/or the locator component 196. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store operating parameters, required operating parameters, and so forth.

The computing device 800 additionally includes a data store 808 that is accessible by the processor 802 by way of the system bus 806. The data store 808 may include executable instructions, operating parameters, required operating parameters, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Figure 9:
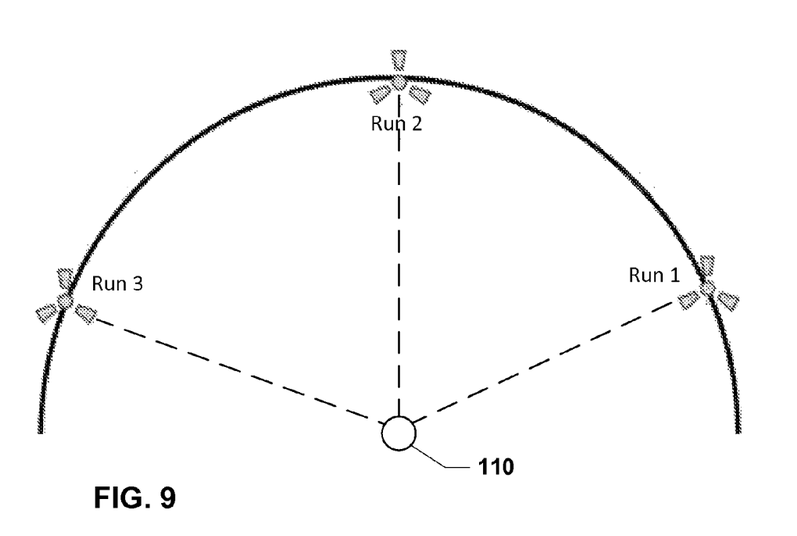
FIG. 9 illustrates locations of three radiation point sources, according to an embodiment.
Figure 10:
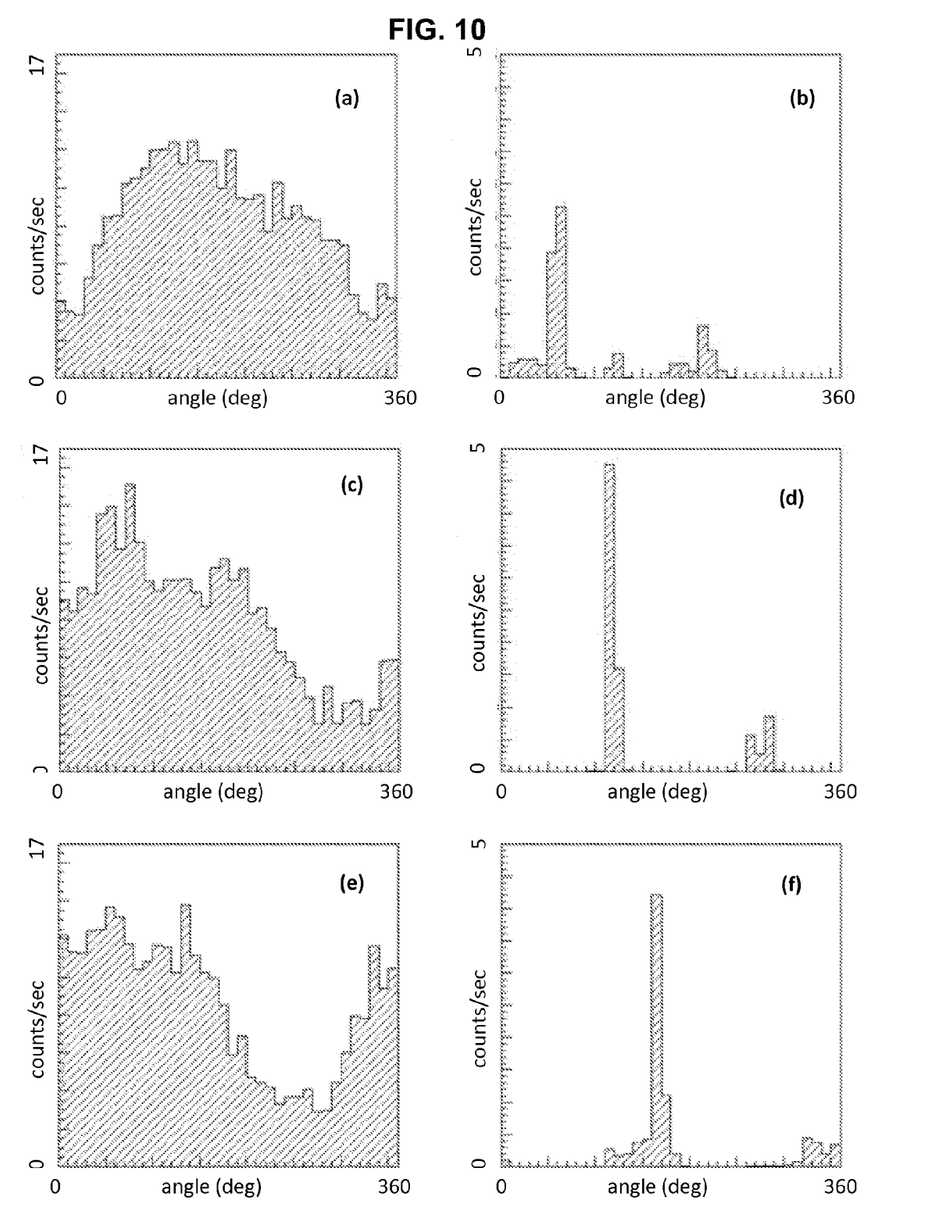
FIGS. 10A-10F depict plots of radiation signals measured for three different point source locations, according to an embodiment.

FIG. 9 illustrates a series of tests conducted to facilitate determination of a plurality of radiation sources (e.g., run 1, run 2, and run 3 respectively). As shown in FIG. 9, a Cf252 neutron source with a neutron emission rate consistent with an International Atomic Energy Agency (IAEA) significant quantity of weapons grade plutonium was positioned in three different locations (e.g., run 1, run 2, and run 3 respectively), with each location being about 50 degrees apart. An imaging system (e.g., imaging system 100) comprising of three detectors was located with respect to the three radiation sources. The measured counts per second in a single detector (e.g., detector A) are plotted in FIGS. 10*a*, 10*c*, and 10*e*, for the three source positions, while a maximum likelihood (MLEM) operation was performed on the measured counts per second, with the determined distributions being presented in FIGS. 10*b*, 10*d* and 10*f* for the three source positions. The signal modulation of the radiation received at detector A, as a function of angle due to the attenuation by detectors B and C as the detectors are rotated about the central position X, is apparent in FIGS. 10*b*, 10*d*, and 10*f*. FIGS. 10*b*, 10*d* and 10*f* indicate the presence of a radiation point source in the appropriate locations, separated by 50 degrees, as expected. Each radiation gathering operation (e.g., at each of run 1, run 2, and run 3) were conducted for approximately a 90 second rotation time of the turntable on which detectors A-C were located.

It is to be appreciated that while the various exemplary embodiments presented herein relate to identifying a direction to, and position of, a radiation source, by determining respective amounts of neutron-based and gamma-ray based radiation, the exemplary embodiments can be applied to any form of electromagnetic radiation and waveforms (such as radio waves, microwaves, infrared light, visible light, ultraviolet light, X-rays, etc.), particles (such as electrons, alpha particles, ions, photons, etc.), soundwaves, etc., which can utilize occlusion of a first detector by a second detector.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
    a first detector located on a turntable, wherein the first detector includes a first volume of scintillation material;
    a second detector located on the turntable, wherein the second detector includes a second volume of scintillation material, the first detector and the second detector rotate about the turntable to facilitate a first position where the first detector is located proximate to a radiation source and a second position where the second detector is located between a position of the first detector and the radiation source; and
    a locator component configured to determine a first count rate of radiation incident upon the first detector when located in the first position and further determine a second count rate of radiation incident upon the first detector when located in the second position, wherein the first count rate of radiation exceeds the second count rate of radiation.

2. The system of claim 1, wherein when the first detector is located at the second position, the second detector acts to mask the first detector from the radiation emanating from the radiation source.

3. The system of claim 1, wherein the radiation in the first count rate of radiation includes at least one of gamma-based radiation or neutron-based radiation.

4. The system of claim 1, wherein the radiation in the second count rate of radiation includes at least one of gamma-based radiation or neutron-based radiation.

5. The system of claim 1, wherein at least one of the first volume of scintillation material or the second volume of scintillation material comprising a liquid scintillation material.

6. The system of claim 5, wherein liquid scintillation material generates a first shaped photon pulse when a neutron impinges on the liquid scintillation material and further generates second shaped photon pulse when a gamma ray impinges on the liquid scintillation material, the first shaped photon pulse and the second shaped photon pulse are disparate.

7. The system of claim 1, further comprising a detection system configured to determine the presence of neutron-based radiation in relation to gamma-based radiation in at least one of the first count rate of radiation and the second count rate of radiation.

8. The system of claim 7, the detection system further configured to identify the direction from the first detector based upon a reduction in an amount of neutron-based radiation between the first count rate of radiation and the second count rate of radiation, wherein the reduction in the amount of neutron-based radiation is a function of the second detector masking the radiation source from the first detector as the first detector and the second detector rotate about the turntable.

9. The system of claim 1, further comprising a third detector located on the turntable and rotating about the turntable in conjunction with the first detector and the second detector.

10. The system of claim 9, wherein when the first detector is located at a third position, the third detector masks the first detector from the radiation emanating from the radiation source.

11. The system of claim 1, wherein the first detector further comprising a first photomultiplier tube, the first photomultiplier tube configured to convert a first amount of photon energy generated by the first volume of scintillation material to a first amount of electrical energy; and wherein the second detector further comprising a second photomultiplier tube, the second photomultiplier tube configured to convert a second amount of photon energy generated by the second volume of scintillation material to a second amount of electrical energy, the first amount of electrical energy and the second amount of electrical energy being conveyed to a counter component to facilitate determination by the locator component of the first count rate of radiation incident upon the first detector when located in the first position and the second count rate of radiation incident upon the first detector when located in the second position.

12. A method comprising:
locating a first detector on a turntable;
locating a second detector on the turntable, wherein during rotating of the turntable the position of the first detector and the second detector changes relative to a remotely located radiation source;

determining a first number of neutrons impinging upon the first detector while the first detector is positioned proximate to the radiation source;
determining a second number of neutrons impinging upon the first detector while the second detector is located between the first detector and the radiation source; and
determining the location of the radiation source based upon a difference between the first number of neutrons and the second number of neutrons.

13. The method of claim 12, wherein when the first detector being located at the second position, the second detector acting to mask the first detector from the radiation emanating from the radiation source.

14. The method of claim 12, wherein during rotation of the turntable the first detector and the second detector rotate through 360° with respect to a central point of the turntable, and the amount of radiation emanating from the radiation source is continuously monitored during motion of the first detector and the second detector.

15. The method of claim 14, wherein, during rotation of the first detector and the second detector about the central point of the turntable a neutron count rate for the first number of neutrons is a maxima in a signal modulation measured across the 360° of rotation and the second number of neutrons is a minima in the signal modulation measured across the 360° of rotation, wherein the minima is a measure of a neutron radiation background.

16. The method of claim 12, wherein the first detector further comprising a first scintillation material and the second detector further comprising a second scintillation material.

17. The method of claim 16, wherein the scintillation material generating a first shaped photon pulse when either of a neutron in the first number of neutrons or a neutron in the second number of neutrons impinges on the scintillation material and further generates second shaped photon pulse when a gamma-based radiation particle impinges on the scintillation material, and the first shaped photon pulse and the second shaped photon pulse are disparate.

18. A non-transitory computer-readable storage medium comprising instructions that, when executed by a processor, cause the processor to perform acts comprising: determining a first number of neutrons impinging upon a first detector while the first detector is positioned proximate to a radiation source, the first detector is located on a turntable; determining a second number of neutrons impinging upon the first detector while a second detector is located between the first detector and the radiation source, wherein the second detector is located on the turntable and during rotating of the turntable the position of the first detector and the second detector changes relative to a remotely located radiation source; and determining the location of the radiation source based upon a difference between the first number of neutrons and the second number of neutrons, wherein the first number of neutrons is a maxima and the second number of neutrons is a minima as the first detector and the turntable rotate through 0° to 360° about a central axis of the turntable.

19. The non-transitory computer-readable storage medium of claim 18, wherein when the second detector being located between the first detector and the radiation source, the second detector acting to mask the first detector from radiation emanating from the radiation source.

20. The non-transitory computer-readable storage medium of claim 19, wherein the first detector further comprising a first scintillation material and the second detector further comprising a second scintillation material.

* * * * *